United States Patent [19]

Geoffroy-Dechaume et al.

[11] Patent Number: 4,765,855
[45] Date of Patent: Aug. 23, 1988

[54] METHOD OF MAKING A SANDWICH MATERIAL WITH INTERNAL UNDULATIONS AND PROTECTIVE LAYERS

[75] Inventors: Vincent Geoffroy-Dechaume, Poissy; Francois De Capele, Paris, both of France

[73] Assignee: I. T. I. Enterprises Ltd., Fribourg, Switzerland

[21] Appl. No.: 773,819

[22] PCT Filed: Jan. 10, 1985

[86] PCT No.: PCT/CH85/00001
§ 371 Date: Sep. 9, 1985
§ 102(e) Date: Sep. 9, 1985

[87] PCT Pub. No.: WO85/03030
PCT Pub. Date: Jul. 18, 1985

[30] Foreign Application Priority Data
Jan. 12, 1984 [FR] France .................. 84 00467

[51] Int. Cl.[4] .................................. B32B 31/12
[52] U.S. Cl. ...................... 156/205; 156/208; 156/210; 156/470
[58] Field of Search .......... 156/205, 208, 210, 244.11, 156/244.22, 470; 428/186

[56] References Cited
U.S. PATENT DOCUMENTS

| | | | |
|---|---|---|---|
| Re. 29,272 | 6/1977 | Hintz et al. .................. | 156/210 |
| 2,102,937 | 12/1937 | Bauer .......................... | 156/210 |
| 3,290,205 | 12/1966 | Goldstein et al. ............ | 156/205 |
| 3,307,994 | 3/1967 | Scott ............................ | 156/210 |

FOREIGN PATENT DOCUMENTS

| | | | |
|---|---|---|---|
| 100928 | 4/1937 | Australia ..................... | 156/210 |
| 359328 | 1/1972 | U.S.S.R. ...................... | 156/205 |

*Primary Examiner*—Caleb Weston
*Attorney, Agent, or Firm*—Omri M. Behr

[57] ABSTRACT

The invention is primarily concerned with a sandwich material (55) made of sheets based on paper. This material is substantially comprised of a sheet (42) of corrugated paper (44) forming one or several layers. An intermediate paper sheet (31) is bonded to the corrugations of the sheet 42. A film (29) of a thermoplastic compound adheres physically as the result of an extrusion to the outer side of the intermediate paper sheet (31).

The process for manufacturing this material consists firstly in extruding a film (29) of thermoplastic compound on the intermediate paper sheet (31), and then in bonding the web (27) of protective layer thus obtained on the corrugations of the sheet of corrugated paper (42).

The invention is remarkable in that these operations are carried out on a standard machine for manufacturing corrugated paperboard. However, on the one hand an adhesive setting instantly at room temperature is used, and on the other hand the various heating elements used to bring about the setting of adhesives polymerizing through an endothermic reaction are kept switched off.

The invention is particularly useful for making furniture or wall panels.

1 Claim, 3 Drawing Sheets

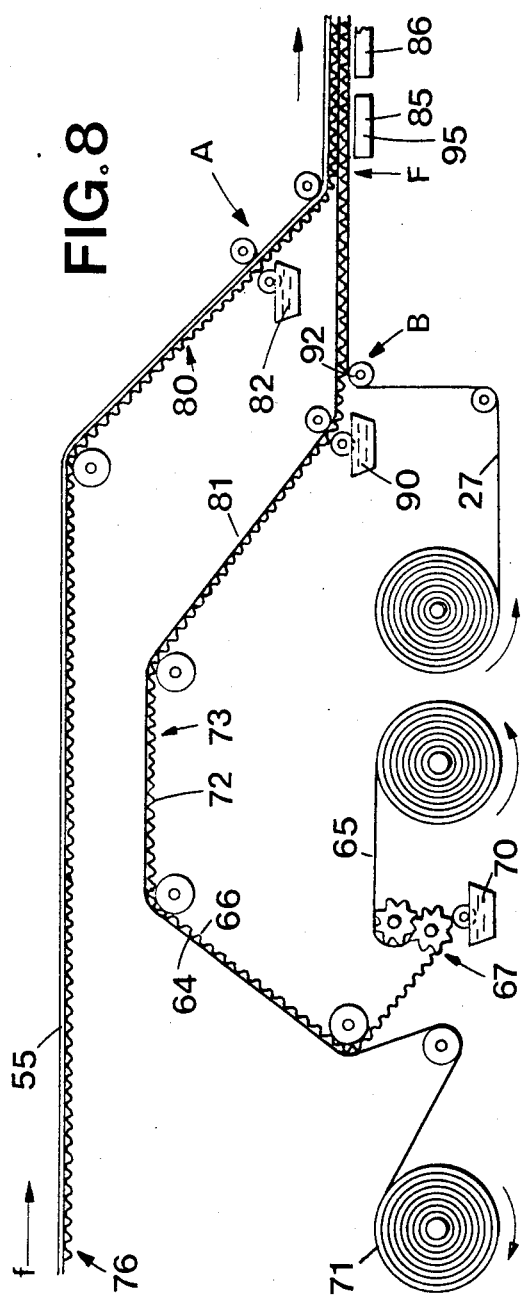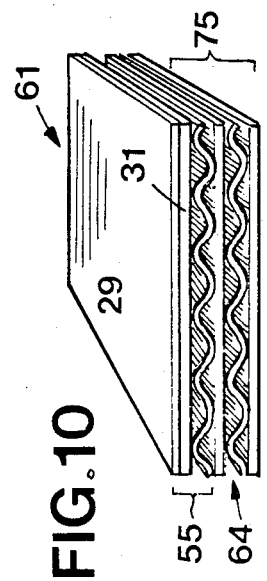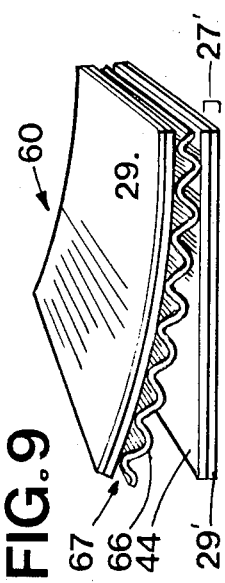

METHOD OF MAKING A SANDWICH MATERIAL WITH INTERNAL UNDULATIONS AND PROTECTIVE LAYERS

The invention is primarily concerned with a new material based on paper, having a central core of corrugated paperboard and an external plastic protection to confer resistance to humidity.

The material of the invention is of the type comprising a central core made of corrugated paper sheets separated by intermediate paper sheets and coated on at least one side by a film of thermoplastic material.

For reasons which will be elaborated upon later, it is rather unusual to associate paper sheets with a sheet of thermoplastic material when developping new types of sandwich materials.

A first known thermoplastic material-paper sandwich is the protective sheet schematically represented in cross section in FIG. 1 of the drawings.

FIG. 1 shows a protective sheet (1) comprised of a supporting paper sheet (3) coated on one side (2) by a film of a thermoplastic material (4), such as polyethylene or polypropylene. This material is used for covering and packaging applications where the paper (1) needs to be protected from humidity. Quite obviously, a similar supporting sheet (3') as shown in FIG. 2 can be coated with a thermoplastic film on both sides (2' and 4').

A second type of thermoplastic material-paper sandwich (5) is schematically represented also in cross section in FIG. 3.

This material comprises a thermoplastic film (3") sandwiched between two sheets of paper 6 and 7. This film confers special mechanical properties to this material which is commonly referred to as "Paratene".

Further, a most widely used material based exclusively on paper called "corrugated paperboard" (9) is schematically represented in FIG. 4.

This material (9) comprises a central core (11) made of a sheet of paper shaped into a succession of corrugations (13). Both sides of the core are covered with a sheet of paper (17, 18).

The covering sheet (17) is bonded to the ridges (14) of the corrugations (13) on the first side of the paper (12) forming the core along the lines (19) where the ridges (14) of the corrugations (13) meet the sheet (17). The other covering sheet (18) is bonded to the core (11) on the second side of the paper (12) along the lines (20) where the ridges (15) meet the sheet (18).

The object of the invention is primarily a sandwich material where the core is made of a block of corrugated paperboard protected and covered on one or both sides by a plastic material.

In principle, the known manufacturing process for corrugated paperboard consisting of one flat sheet of protective paper bonded on a corrugated core first comprises the steps of producing a web of intermediate protective paper and feeding this web to a machine producing the corrugated paperboard. A web of core paper having the same width as the web of protective paper is fed to two serrated rolls for impressing transverse corrugations. The web of protective paper and the sheets of corrugated paper are fed at the same speed.

The ridges on the second side of the core paper are then coated with adhesive, and the core paper is fed to the part of the machine where the core paper is bonded to the protective paper. The two webs are fed with the side of the core coated with adhesive facing the inner side of the protective paper.

The web of protective paper is mainained facing the part of the machine where the bonding is effected by means of intermediate rollers. The corrugated paper is fed between one of the rollers and the protective paper. The second side of the corrugated paper is thereby pressed against the inner side of the protective web.

The adhesive used as a solution for bonding the web of protective paper to the ridges of the corrugated core is usually of a type polymerizing through an exothermic reaction. The adhesive preparations normally used are starch-based water solutions. When this is actually the case, the water opens the pores of the two webs. The bonding of these webs together requires a heat treatment which breaks the starch grains open. For this purpose, the machine comprises heating elements for increasing the temperature of the two paper webs when they come together and for some time after. These heating elements can consist of compression means such as rollers which are heated to an elevated temperature, or heating tables placed on the path of the corrugated paperboard.

To achieve the objectives of the invention, i.e. produce a sandwich material covered with a plastic material, one could consider using a web of protective material consisting of a film of thermoplastic plastic for assembling with a sheet of corrugated paper in the same manner as described above. In industrial practice however, assembling together a film of thermosetting plastic and a sheet of corrugated paper has proven to be most difficult.

It is also easily understood that it is impossible to use the process developped for manufacturing corrugated paperboard when the protective web is a film of thermoplastic material. In fact this process implies the use of a solution of a thermosetting adhesive, which imposes a heating of the two sheets which are bonded to a temperature approximating 200° C., in particular to break the starch grains open. However, thermoplastics such as polyethylene and polypropylene have a melting temperature of respectively 80° C. and 120° C.

The present invention has for purpose to eliminate these disadvantages.

The invention as defined in the claim solves the problem of the manufacture of a sandwich material having a core of corrugated paperboard with parallel corrugations. The sandwich material according to the invention is remarquable in that a flat film of thermoplastic material is bonded to the corrugations, thereby covering at least one side of the sheet of corrugated paper.

The invention further provides a manufacturing process for producing such a sandwich material based on paper with a central core comprising one or a plurality of layers of corrugated paperboard protected on one or both sides by a film of thermoplastic material.

The advantage of the invention is primarily that the core of the corrugated paperboard is protected against humidity and outside aggressions by a protective layer consisting of an unputrescible material. Further, this protective layer has a pleasant touch and improves the appearance of the paperboard. Also, it can be produced in a variety of colours.

Another advantage of the invention is that the sandwich material which is proposed can be produced at a very low cost and in very large quantities on the equipment presently used for producing corrugated paperboard.

The new sandwich material is recommended for use in a number of areas where corrugated paperboard is presently not used; in particular a demand has developed during the recent years for furniture made from corrugated paperboard. The difficulty was to achieve a product which could withstand humidity and the stresses to which furniture is subjected.

As a result of intensive research carried out in collaboration with cardboard manufacturers and research organizations, the Applicants succeeded in developing sheets of cardboard which could have been used for making furniture capable of supporting loads of approximately 400 kg. The method consisted in introducing in the pores of the paper soluble formaldehyde-urea resins. However, it was found that the appearance and the resistance to humidity of this material were not totally satisfactory.

The present invention solves this problem and enables the manufacture of highly rigid furniture having a pleasant appearance by using a paperboard-propylene sandwich material.

The invention will be now described more in detail with reference to the drawings illustrating several embodiments of this invention.

In these drawings:

FIG. 5 is a schematic view of the equipment recommended for manufacturing a sandwich material according to the invention where a central core of corrugated paper is provided on one side with a plastic material for protection against humidity, FIG. 6 is a perspective view showing in cross section the protective sheet coated on the outside with a thermoplastic material for protecting the sandwich material of the invention, FIG. 7 is a perspective view showing in cross section a portion of the sandwich material provided with a protection on one side and manufactured using the equipment of FIG. 5.

FIG. 8 is a version of the equipment used for manufacturing the sandwich material of the invention comprising a central multilayer core of corrugated paperboards protected on one or on both sides by a film of thermoplastic material.

FIG. 9 is a perspective view of a portion of a sandwich material comprising one layer of corrugated paper protected on one side, manufactured with the equipment of FIG. 8 and thereafter torn open.

FIG. 10 is a perspective view of a portion of sandwich material comprising two layers of corrugated paperboard provided with a protection on both sides and manufactured on the equipment of FIG. 8.

Figure 5:
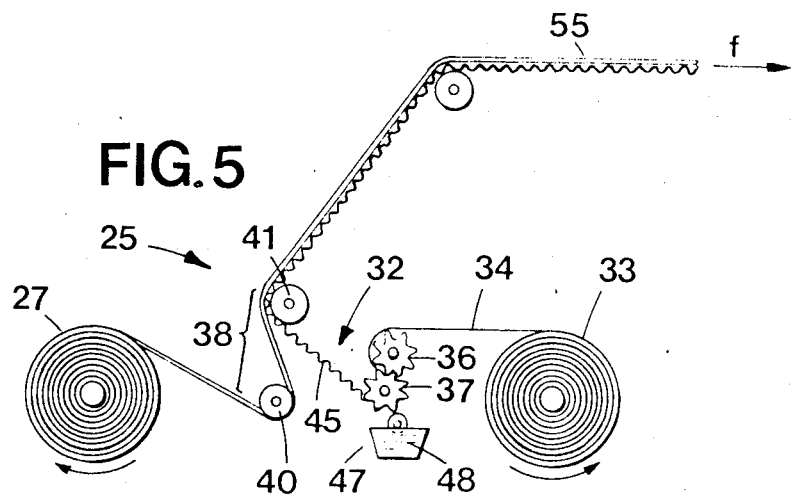

One recognizes on FIG. 5 the basic components of a machine used for making corrugated paperboard (25).

Figure 6:
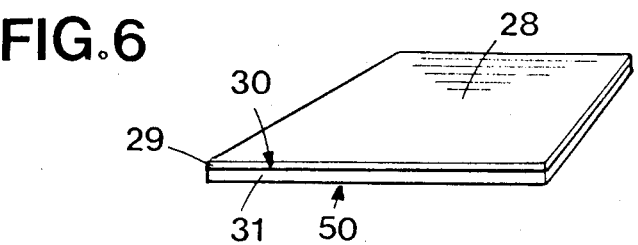

The process of the invention consists in first obtaining a first web (27) of protective layer (28) by extruding a film (29) of a thermoplastic compound such as polyethylene on the outer side (30) of a first intermediate paper sheet (31). The resulting material is shown in cross section in FIG. 6.

The web of protective layer (27) is fed to a first adhesive bonding zone (32) by exerting a traction on said web in the direction of the arrow f.

Further, and in accordance with usual practice, a second web (33) of core paper (34) is fed to the machine. This web of core paper is fed between two serrated rollers (36, 37). Tensioning means (38) are provided for maintaining the first web (27) of protective layer under tension in the first adhesive bonding zone (32). These tensioning means primarily consist of two tensioning rollers (40, 41) which are alternatively positioned against the two sides of the web (27).

As a result of its passage between the serrated rollers (36,37), the second web (33) is transformed into a sheet (42) of corrugated paper (44). The ridges (49) of the second side (45) of this sheet (42) of corrugated paper (44) are coated with a solution of an adhesive (48) in an adhesive application system (47). The sheet of corrugated paper (44) is then directed to the adhesive bonding zone (32) with the second side (45) of the sheet (42) facing the inner side (50) of the first web (27) of protective layer. The sheet (42) of corrugated paper (44) and the first web (27) of protective layer are fed to the adhesive bonding zone at the same speed.

The sheet (42) of corrugated paper (44) is fed under pressure means (41) and between on the one hand the first web (27) of protective layer and on the other hand the second tensioning roller (41). Under these circumstances, the second side (45) of the sheet (42) of the corrugated paper (44) is pressed against the inner side (50) of the first web (27) of protective layer.

In the process of the invention, the adhesive application system uses a solution of an adhesive (48) which sets instantly at room temperature. Further, the tensioning means (38) and in particular the tensioning rollers (40, 41) are kept at a temperature lower than the melting temperature of the thermoplastic compound extruded on the outer side (30) of the sheet (31) of intermediate paper. The heat can be simply cut off in the tensioning rollers (40, 41). These rollers are heated when standard corrugated paperboard is manufactured.

One will understand that under these circumstances:

on the one hand, the melting of the film (29) of thermoplastic compound is prevented, and on the other hand, the first web (27) of protective layer is bonded to the sheet (42) of corrugated paper (44).

The web is fed at a speed ranging from 80 to 120 m/min and the legth of the bonding zone amounts to 10 cm. It is therefore necessary to use an adhesive (48) capable of setting almost instantly at room temperature.

It is recommended to use preferably in the process of the invention an adhesive consisting of two separate active components:

the first component ensures a preliminary but instant bonding between the ridges of the corrugations of the second side (45) of the sheet (42) of corrugated paper (44) and the first web (27) of protective layer, and the second component consolidates the bond later in time by polymerizing through an adiabatic reaction.

Figure 1:
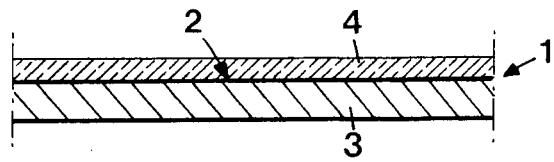
Figure 2:
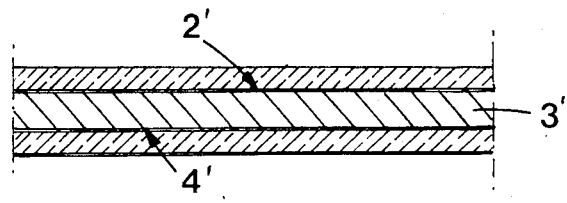
Figure 3:
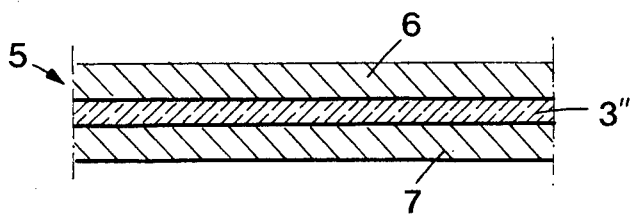
Figure 4:
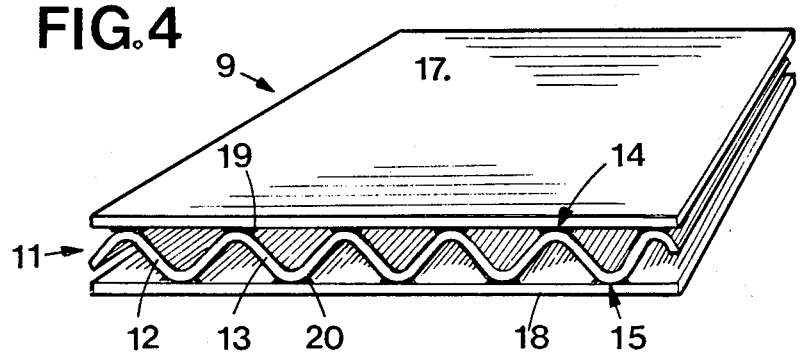
Figure 7:
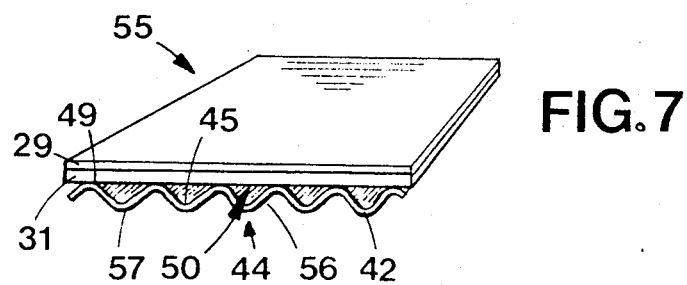

The sheet of sandwich material (55) manufactured with the equipment shown in FIG. 5 is described hereafter with reference to FIG. 7.

It can be seen that on the one hand, the first side (56) of the sheet (42) of corrugated paper (44) is free and leaves the corrugations (57) exposed, and on the other hand, this sheet (42) of corrugated paper (44) is covered on its second side (45) with a flat film (29) of a thermoplastic material adhering to the ridges (57).

More precisely, the sandwich material (55) comprises from the bottom upwards: a sheet (42) of corrugated paper (44), the corrugations (57) of which are exposed on the first side of the material; a substantially flat sheet (31) of intermediate paper covering the second side (45) of the sheet (42) of corrugated paper (44) with its inner side (50) bonded to the ridges (49) of the corrugations (57) of the second side (45); and finally, a film (29) of a thermoplastic compound such as polyethylene adhering physically to the pores of the outer side of the sheet (31) of intermediate paper as the result of an extrusion.

The sandwich material (55) produced on the equipment of FIG. 5 can be further submitted to the additional process of FIG. 8, either adding a second protective layer to produce the sandwich material of FIG. 9, or increasing the number of internal layers of corrugated paperboard to produce the material (61) of FIG. 10.

The first step in the manufacture of a multilayer sandwich material (61) consists in producing a series of webs (64) of corrugated paperboard and has been described in the preamble of the present application. The corrugations (66) are impressed on the web of core paper (65) to obtain a sheet of corrugated paper (67) with the same equipment as shown in FIG. 5. In this case however, a second solution of a thermosetting adhesive (70) which polymerizes through an endothermic reaction will be preferably used. Since the first web (27) of protective layer is replaced by a simple web of intermediate paper (71), the question of the deterioration of the film of thermoplastic material does not arise, and it is possible to use an adhesive which has a more favourable effect on the bonding of the web (71) of intermediate paper on the transverse corrugations (66) of the corrugated paper (67).

It is also possible to assemble a plurality of webs (64) of corrugated paperboard and obtain thereby a multilayer block. To manufacture such a multilayer block, the webs (64) of corrugated paperboard will be bonded together by means of a third solution of adhesive which is coated on the ridges (71) of the corrugations on the free side (73) of each web (64) of corrugated paperboard. Using appropriate pressure means, the free side (73) of a corrugated paperboard will be bonded to the outer side of the intermediate sheet of paper of an adjoining web of corrugated paperboard.

In the manufacture of the multilayer blocks, a third solution of adhesive will be used, which also polymerizes through an endothermic reaction. After the application of the adhesive, the webs (64) of corrugated paperboard will be subjected to a heat treatment, in particular by heating the pressure means which press the webs together.

Now, the manufacture of a block of multilayer sandwich material (75) as shown in FIG. 10 will be described. A web (76) of sandwich material (55) having a plastic protection on one side and made on the equipment of FIG. 5 by assembling a web (27) of protective layer with a first sheet (42) of corrugated paper (44) on the one hand, and a block of corrugated paperboards on the other hand are used for this purpose. The manufacturing process is shown in part (A) of FIG. 8. The first side (80) of the sandwich material (55) provided with the corrugations (57) is applied flat on the free side (81) of the intermediate sheet of paper coating a block of corrugated paperboards (64). The bonding is achieved by using a fourth solution of adhesive (82) which is applied between the ridges of the corrugations (57) of the sandwich material (55) and the intermediate sheet of paper (81).

It is preferable to use in the process of the invention a fourth solution of a thermosetting adhesive (82) which polymerizes through an endothermic reaction. After the application of the sandwich material (55) having a plastic protection on one side against the block (64) of corrugated paperboards, the assembly is subjected to a flow of heat (F), and in particular from the heating tables (85, 86). It should be noted that this flow of heat (F) is directed from the side on which the block (64) of corrugated paperboard is found. In this manner, not only the first sheet (42) of corrugated paper (44) of the sandwich material (55), but also the other corrugations (72) of the block (64) of corrugated paperboards protect the film (29) of thermoplastic material from the flow of heat (F).

The method for manufacturing a sandwich material (60) provided with a plastic protection on both sides is shown in part (B) of FIG. 8.

Firstly, a second web (27') of protective layer consisting of a second film (29') of a thermoplastic material extruded on the outer side of a second intermediate sheet of paper (44') is manufactured. A fourth solution of adhesive (90) is applied on the free corrugations (72) of the first side of the sandwich material (55) made to comprise either a single layer of corrugated paperboard (obtained according to the method of FIG. 5) or several layers of corrugated paperboard (obtained according to the method of Part A of FIG. 8).

The inner side of the second web (27') of protective layer is pressed by appropriate pressure means (92) against the ridges of the corrugations (72) of the first side of the sandwich material (55). As in the method shown in FIG. 5, a fourth solution of adhesive (90) is used, which sets instantly at room temperature. To prevent any damage to the film (29') of thermoplastic material from heat, parts of the equipment such as the pressure means (92) and the heating tables (85, 86) located on the path of the second web (27') of protective layer downstream of the assembling unit are kept at a low temperature.

It is clear that the increased rigidity of the sandwich material (64) with a plastic protection on one side makes the bonding of the second web (27') of protective layer much easier. Therefore, a sandwich material having a plastic protection on one side can also be assembled using an adhesive setting instantly at room temperature, and thereafter bonded to a second web of protective layer using an endothermic adhesive.

During the manufacture of the sandwich material (55, 60 61), the web (27, 27') of protective layer is kept under tension by tensioning means such as the rollers (40, 92). Also, the sandwich material is fed past heating means such as the heating tables (85, 86). These various machine parts can come in contact with the film (29, 29') of thermoplastic material.

In one version of the invention, the rollers (40, 92), the heating means (85, 86) and more generally all the metal parts found on the path of the web (27, 27') of protective layer are advantageously covered with a flexible material (95) to protect the thermoplastic film (29, 29') from being scratched. This version of the invention is made possible by the fact that the parts mentioned above are not heated.

The inventors, having demonstrated the advantages of their invention as described above, reserve for themselves the right to exploit their invention for the duration of the patent without any other limitations than the appended claim defining the scope of the invention.

What is claimed is:

1. A process for the preparation of a paper based sandwich material having an internal block of corrugations formed from two sheets of corrugated paper isolated from each other by the interposition therebetween of a sheet of paper, said internal block being placed between a first and second covering sheets themselves formed of a first inner sheet and a second outer sheet said composite being resistant to humidity by virtue of an external plastic coating, each of the covering sheets being obtained by the assembly of said first and second sheets mentioned above wherein a first sheet of corrugated paper is glued by the ridges of its corrugation to the inner face of the first covering sheet to provide a first web of corrugated card with a single planar outer surface, a second sheet of corrugated paper is glued by the troughs of its corrugation to an intermediate sheet of paper to give a second web of corrugated card with a single planar inner surface, the second covering sheet is glued by its inner surface to the free ridges of the corrugations of the second web of corrugated card, the troughs of the corrugations of said first web are glued to the free upper suface of the intermediate paper sheet of said second web, to give a composite sandwich material of corrugated card having two flat outer faces with corrugations on the inner faces thereof separated by the interposition of the sheet of intermediate paper, characterized by the steps of (a) providing a first protective web comprising a first sheet of paper having a protective layer of thermoplastic material on the outer face thereof, feeding said first protective web to a first adhesive application zone, disposing in said first adhesive application zone, a solution of rapid acting cold setting adhesive, feeding a first corrugated sheet of paper towards the zone of adhesion and disposing a portion of said solution of cold setting adhesive upon the ridges of said corrugations on one side of the first sheet of corrugated paper, bringing the glued face of the said first corrugated sheet towards the inner side of the protective web and feeding the sheet and the protective web face to face at the same speed while maintaining the first protective web under tension in said adhesive bonding zone by means of tensioning cylinders, pressing the glued face of sheet against the internal side of the protective web through a cylinder, said cylinder being maintained at a temperature less than the melting temperature of the thermoplastic material to yield a first web of corrugated material having an upper planar face, (b) simultaneously producing a second web of corrugated card having a planar surface by feeding an intermediate paper sheet to a second adhesive application zone, disposing a solution of thermosetting adhesive activated by endothermic polymerization in said second adhesion zone, and feeding a second sheet of corrugated paper into said second adhesive application zone and disposing a portion of said thermosetting adhesive onto the ridges of the corrugations of one side of said second sheet of corrugated paper, bringing the glued face of the said second corrugated sheet towards the inner side of the sheet of intermediate paper and feeding said second corrugated sheet and the intermediate paper sheet face to face at the same speed while maintaining the paper sheet under tension in said adhesive bonding zone by means of tensioning cylinders, pressing the glued side of corrugated sheet against the inner side of the intermediate sheet through a cylinder, said cylinder being maintained at a temperature above the activation temperature of the thermosetting adhesive to yield a second web of corrugated material having an upper planar face, (c) assembling an initial composite web having an outer protective layer, a paper layer, a corrugated paper layer and a further paper layer, comprising the steps of providing a second protective web comprising a second sheet of paper having a protective layer of thermoplastic material on the outer face thereof, feeding said second web to a third adhesive application zone, disposing in said third adhesive application zone, a solution of rapid acting cold setting adhesive, feeding said second web of corrugated material into said third adhesion zone and disposing a portion of said cold setting adhesive onto the troughs of the exposed corrugations of said second corrugated web, bringing the glued face of the said second corrugated web towards the inner side of the second protective web and feeding the said corrugated web and the second protective web face to face at the same speed while maintaining the said second corrugated web under tension in said adhesive application zone, pressing the glued side of said corrugated sheet against the inner side of the second protective web through a cylinder, said cylinder being maintained at a temperature below the fusion temperature of the thermoplastic material to provide said initial composite web, bringing the glued face of the said first corrugated web towards the upper planar surface of the initial composite web and feeding the said first corrugated web and the initial composite web face to face at the same speed while maintaining the said corrugated web under tension in a fourth adhesive application zone, pressing the glued side of said first corrugated web against the upper planar surface of the initial composite web through a cylinder, passing the resulting material sandwich over heating tables in contact with the thermoplastic film faces while maintaining a lower temperature than the temperature of fusion of thermoplastic material but sufficient to cause the polymerization of the adhesive.

* * * * *